United States Patent [19]
Koizumi

[11] 3,724,940
[45] Apr. 3, 1973

[54] ELECTROPHOTOGRAPHIC COPYING APPARATUS WITH MEANS FOR ERASING MARGINAL IMAGES

[75] Inventor: Yutaka Koizumi, Yokohama, Japan
[73] Assignee: Ricoh Co., Ltd., Tokyo, Japan
[22] Filed: Nov. 24, 1971
[21] Appl. No.: 201,654

[30] Foreign Application Priority Data

Dec. 7, 1970 Japan ...........................45/107647
Dec. 15, 1970 Japan ...........................45/111172

[52] U.S. Cl. .....................355/3 R, 355/7, 355/11, 96/1 R
[51] Int. Cl. .............................................G03g 15/00
[58] Field of Search........355/3, 7, 11, 14, 67, 27, 44; 96/1

[56] References Cited

UNITED STATES PATENTS

| | | | |
|---|---|---|---|
| 3,671,211 | 6/1972 | Albert | 355/17 X |
| 3,687,538 | 8/1972 | Matsumoto | 355/3 |
| 3,556,655 | 1/1971 | Lux et al. | 355/3 X |
| 3,503,677 | 3/1970 | Uchiyama | 355/7 X |
| 3,437,409 | 4/1969 | Friedel | 355/27 X |

FOREIGN PATENTS OR APPLICATIONS 867,032   9/1941   France ..............................355/100

Primary Examiner—Samuel S. Matthews
Assistant Examiner—Richard M. Sheer
Attorney—Henry T. Burke et al.

[57] ABSTRACT

Electrophotographic copying apparatus, such as electrophotographic duplicators, electrophotographic plate making machines and the like, in which an image of an original is formed on a photosensitive sheet, said apparatus provided with means for erasing undesirable images formed on selected marginal areas of the photosensitive sheet. Eraser light sources are provided for illuminating the marginal areas of a photosensitive sheet for the purpose of preventing the formation of undesirable images on said marginal areas. Manually adjustable intercepting plates are interposed between the eraser light sources and the photosensitive sheet for the purpose of selecting the particular marginal portions of the photosensitive sheet which are to be illuminated by the eraser light sources. The photosensitive sheet is transported to an exposing position by means of conveyer belts and is held against said conveyer belts by means of a suction box. A plurality of concentric frames may be drawn on the suction box, and the conveyer belts may be made of transparent material, such that an operator looking through a viewing window before a photosensitive sheet is transported to the exposing position may adjust the intercepting plates to allow illumination of the marginal area outside a selected frame by said eraser light sources, and may adjust the position of the original to make sure its image falls within a selected frame on the suction box.

5 Claims, 3 Drawing Figures

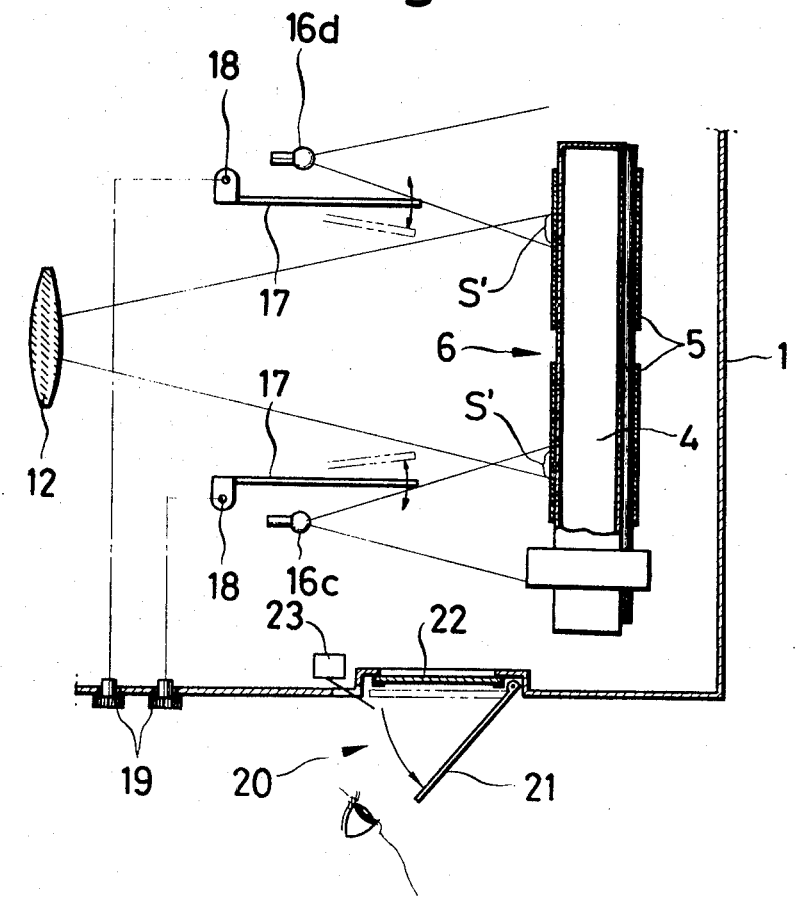

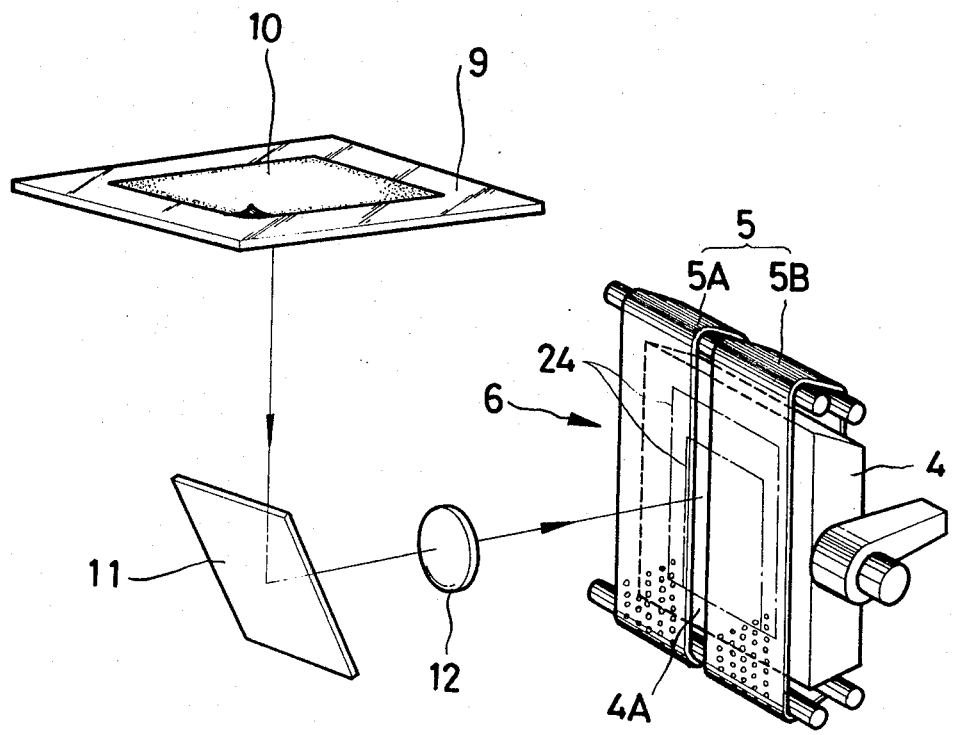

ELECTROPHOTOGRAPHIC COPYING APPARATUS WITH MEANS FOR ERASING MARGINAL IMAGES

BACKGROUND OF THE INVENTION

The invention relates to electrophotographic apparatus, such as electrophotographic duplicators, electrophotographic plate making machines and the like, designed to expose a photosensitive sheet to an optical image of an original for the purpose of forming, by optical means, the image of the original on the photosensitive sheet. In such apparatus, an original is placed on a transparent original receiving plate, with the original image facing the transparent plate carrier, and the original is illuminated by exposing light sources. Light reflected from the original is directed to a photosensitive sheet held at an exposing position. When forming an image on the photosensitive paper as aforementioned, and particularly when the image formed on the photosensitive paper is a reduction or a magnification of the original, undesirable shadows may be formed on the peripheral margins of the photosensitive sheet. These shadows are images of the periphery of the original receiving plate around the original, of stains and specks on said periphery of the original receiving plate and of stains and specks on the peripheral marginal portion of the original around the image whose duplication is desired. It has been heretofore customary to use an eraser solution or eraser powder to remove these undesirable images from duplicates of the original formed on said photosensitive sheet, but this has involved expensive and cumbersome operations, and the need has existed for providing more efficient and less cumbersome means for removing or preventing said undesirable images.

SUMMARY OF THE INVENTION

The invention is in the field of electrophotographic copying apparatus, such as electrophotographic duplicators, electrophotographic tape making machines and the like, designed to form an image of an original on a photosensitive sheet. In particular, the invention relates to preventing the formation of undesirable images around the periphery of the photosensitive sheet outside the area of the desired image of the original.

The invention provides shadow eraser light means comprising one or more eraser light sources for illuminating marginal areas of the photosensitive sheet around the desired image of an original so as to prevent the formation of undesirable images on said marginal portion. Manually adjustable light intercepting plate means are interposed between the eraser light source means and the photosensitive sheet to selectively block portions of the light emanating from the eraser light source means so as to cause the eraser light source means to illuminate selected marginal portions of the photosensitive sheet.

The invention also provides a viewing window through which an operator can see the exposing position inside a copying machine in order to ensure that the eraser light source means illuminates the proper portions of the exposing position and to adjust the light intercepting plate means such that undesirable images are eliminated.

The invention also provides a photosensitive sheet conveyor belt means made of transparent material and a member positioned behind the conveyer belt means in the exposing position, said member having marked thereon a plurality of frames corresponding to predetermined sizes of photosensitive sheets. The combination of the transparent photosensitive sheet conveyer belt means the member positioned therebehind allows an operator to see through said viewing window the frames on the member behind the transparent photosensitive sheet conveyor belt means and to adjust, if necessary, said light intercepting plate means such that the eraser light source means illuminates desired portions of the exposing position to prevent the formation of undesirable images on a photosensitive sheet exposed at said exposing position. This combination also allows determining by looking through the viewing window if the original is centered such that its image on the member behind the belt means falls within a selected frame, and if the image would fit on a particular photosensitive sheet.

BRIEF DESCRIPTION OF THE DRAWINGS

FIG. 2 is a schematic horizontal sectional view of the exposing portion of the apparatus shown in FIG. 1.

FIG. 3 is a partial schematic perspective view of the exposing portion shown in FIG. 2.

DETAILED DESCRIPTION

Figure 1:
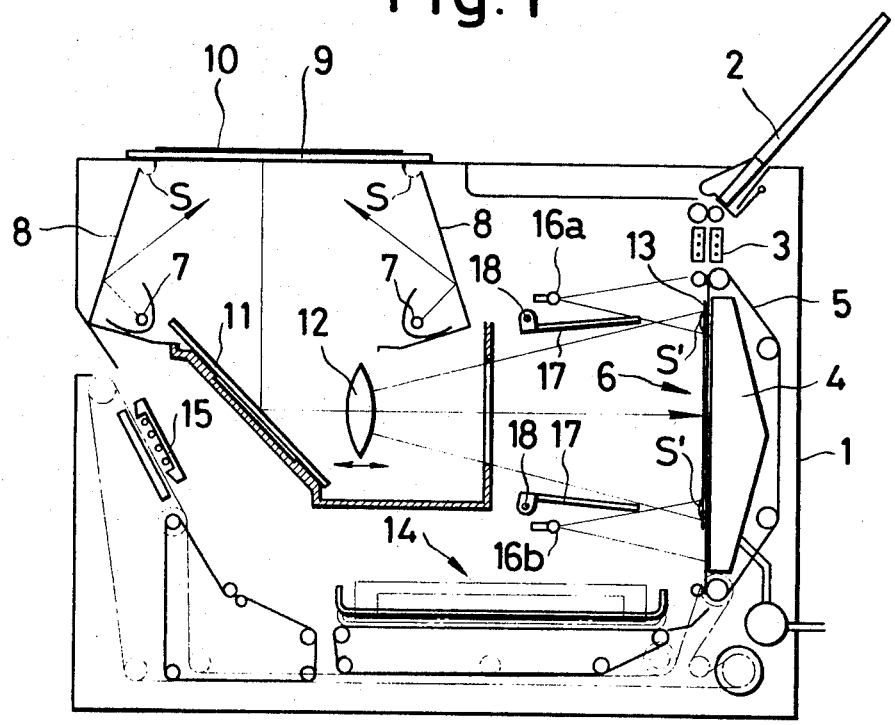
FIG. 1 is a schematic vertical sectional view of an electrophotographic plate making machine provided with an optical shadow erasing device according to the invention.

In FIG. 1, a photosensitive sheet supplied to an electrophotographic plate making machine 1 through a sheet feed mechanism 2 is uniformly charged at an electrically charging section 3 of the machine 1 and is conveyed by a conveyer belt means 5 under the drawing action of a suction box 4 to an exposing position 6. The photosensitive sheet 13 is held at the exposing position 6, and exposing light sources 7 are turned on and the light emanating therefrom is directed by means of reflectors 8 onto a transparent original receiving plate 9. The light incident on the transparent original receiving plate 9 is reflected by an original 10 placed on the transparent plate 9 with its surface to be duplicated facing downwardly. The light reflected from the original 10 is directed by a reflector 11 through a movable optical system 12 at the exposing position 6 so as to form an image of the original 10 on the photosensitive sheet 13 held at the exposing position 6 by means of the conveyer belt means 5 and the suction box 4.

Upon completion of exposing, the photosensitive sheet 13 is conveyed again by the conveyor belt means 5 to a developing section 14 where the electrostatic latent image on the photosensitive sheet 13 is rendered visible. Then, the photosensitive sheet 13 passes through a fixing section 15 where it is heated so as to firmly adhere the visible image to the sheet 13 before the sheet 13 is discharged through an outlet as a duplicate.

While the photosensitive sheet 13 is exposed at the exposing position 6, stains and specks on the marginal portions of the original 10 or on the marginal portions S of the transparent original receiving plate 9 around the original 10 may be formed as images or shadows S' on the marginal portions of the photosensitive sheet 13 of the exposing position 6 by the light emanating from the exposing light sources 7 and directed to the sheet 13 by means of the reflector 13 and the optical system 12. Such undesirable images or shadows S' reduce the value of the duplicates made from the original 10 and render such duplicates commercially undesirable.

The subject invention provides shadow eraser light source means comprising light sources 16a and 16b which are independent of the exposing light sources 7. The light emanating from the eraser light sources 16a and 16b illuminates the marginal areas of the exposing position 6 where the shadows S' may be formed and prevents the formation of such shadows S'. More specifically the light emanating from the eraser light sources 16a and 16b is controlled by light intercepting means comprising intercepting plate 17 so that the light from the eraser light sources 16a and 16b illuminates only the areas where the shadows S' may be formed without illuminating the portion of the photosensitive sheet 13 on which the desired image of the original 10 is formed at the exposing position 6. Preferably, each of the intercepting plates 17 is journaled at one end 18 thereof for pivotal motion so as to adjust the illumination of the photosensitive sheet 13 at the exposing position 6 by the light emanating from the eraser light sources 16a and 16b.

While the eraser light sources 16a and 16b shown in FIG. 1 are disposed to illuminate the top and the bottom marginal portions of the exposing position 6, FIG. 2 shows another set of eraser light sources 16c and 16d disposed to illuminate the two side margins of the exposing position 6 which are not illuminated by the eraser light sources 16a and 16b of FIG. 1. Each of the eraser light sources 16c and 16d has a position adjustable light intercepting plate 17 of the same construction and of the same operation of the light intercepting plates 17 described in connection with FIG. 1. Each light intercepting plate 17 shown in FIG. 1 is provided with an adjusting knob 19 operable from outside the copying machine 1 to adjust the position of the plate 17. The knobs 19 are suitably connected with the plate 17 such that rotation of the knobs 19 in one direction pivots the plates 17 in one direction, and rotation of the knobs 19 in the opposite direction pivot the plates 17 upwardly as viewed in the plane of FIG. 2. Each of the light intercepting plates 17 shown in FIG. 1 may also be provided with a manually operable knob 19 operating in the same manner as serving the same function as the knobs 19 described in connection with FIG. 2.

In the embodiment of the invention described above, one eraser light source is provided for illuminating each of the four margins of the exposing position 6. It is to be understood, however, that the invention is not limited to the specific number of eraser light sources, and that the eraser light source means may be arranged to illuminate either one, two, three or four sides of exposing position 6. The invention may be incorporated not only in electrophotographic plate making machines, but also in other types of electrophotographic copying machines and duplicators.

In another aspect of the invention, a viewing window 20 is provided in one side wall of the machine 1 in the vicinity of the exposing position 6. The viewing window 20 includes a transparent plate 22 and a hinged opaque door 21. By opening the door 21, the operator can look through the transparent plate 22 to see the exposing position 6 and to find out if the eraser lights 16a, 16b, 16c and 16d illuminate the margin areas of the exposing position 6 properly. If necessary, the operator can adjust the position of the light intercepting plates 17. A switch 23 is suitably positioned to be actuated by the door 21 so as to turn on the exposing light sources 7 and the eraser light sources 16a, 16b, 16c and 16d when the door 21 is opened as shown in solid lines in FIG. 2. By this arrangement, it is possible for the operator to turn on the exposing light sources 7 and the eraser light sources 16a, 16b, 16c and 16d by opening the viewing window door 21 and to see the exposing position 6 through the transparent window 22 to ascertain whether the exposing light sources 16a, 16b, 16c and 16d illuminate properly the marginal portions of the exposing position 6 around the desired image of the original 10 so as to eliminate undesirable marginal images. Preferably, the switch 23 is suitably electrically connected to turn off the exposing light sources 7 and the eraser light sources 16a, 16b, 16c, and 16d when the viewing window door 21 is in its closed position shown in broken lines in FIG. 2.

Another feature of the invention relates to providing a conveyor belt means 5 made of a transparent material. Referring to FIG. 3, belt members 5A and 5B of the conveyor belt means 5 have a multitude of suction apertures for holding the photosensitive sheet 13 againt the conveyor belt members 5A and 5B by means of suction created by the suction box 4. A plurality of frames 24 is drawn or otherwise superimposed on a surface 4A of the suction box 4 which surface 4A is adjacent to and faces the conveyor belt members 5A and 5B. The surface 4A is also provided with a multitude of suction apertures. The frames 24 on the suction box surface 4A can be seen through the transparent conveyor belt members 5A and 5B by an operator looking through the viewing window 20. This feature permits an operator to ascertain if an image of the original 10 is correctly disposed on a required portion of the frame 24 corresponding to the particular size of the photosensitive sheet used. If the photosensitive sheet used is of a size corresponding to a particular one of the frames 24, the operator looking through the viewing window 20 can ascertain if the image of the original 10 is entirely contained within that particular frame 24. If necessary, the operator can adjust the position of the original and the position of the light intercepting plates 17. The surface 4A of the suction box 4 is preferably formed as a white colored irregularly reflecting surface so as to aid in the observation of an image of the original formed thereon.

In operation, an original 10 is placed on top of the original receiving plate 9 with the original image which is to be duplicated facing downwardly. An operator may then open the viewing window door 21, thereby turning on the exposing light sources 7 and the erasing light sources 16a, 16b, 16c and 16d. At this time, there is no photosensitive sheet 13 at the exposing position 6, and an image of the original 10 is formed onto the surface 4A of the suction box 4. The operator can ascertain by looking through the viewing window 20 at the exposing position 6 if the image formed on the surface 4A of the suction box 4 fits within that frame 24 which corresponds to the particular size of the photosensitive sheet 13 which is to be used. The operator may adjust the position of the original 10 with respect to the transparent plate 9, and may then adjust by means of turning knobs 19 the intercepting plates 17 such that the erasing light sources 16a, 16b, 16c and 16d properly illuminate the marginal sections of the exposing position 6 which surround the desired image of the original 10. The illumination of these marginal portions by the erasing light sources 16a, 16b, 16c and 16d prevents the formation of undesirable images around the desired image of the original 10. The operator may then close the viewing window 20 and may start a duplicating operation by feeding a sheet 13 to the conveyor belt means 5.

From the foregoing description, it should be appreciated that the subject invention offers many advantages. The features that the undesirable images or shadows formed on the marginal portions of the photosensitive sheet 13 are erased by light during the exposure of the photosensitive sheet 13 eliminates the need to erase such undesirable images or shadows with an eraser solution or eraser powder in an additional operating step following exposure. Additionally, this feature reduces the area of the photosensitive sheet 13 onto which a toner adheres in the developing operation, thereby reducing the consumption of toner.

The provisions of a conveyor belt means made of transparent material and the plurality of frames on the suction box 4 allows an operator to optimize the position of the original and of the adjustable light intercepting plates 17 so as to ensure a properly centered image of the original and proper prevention of undesirable images on the marginal portion of the photosensitive sheet 13 surrounding the desired image of the original thereon.

I claim:

1. Electrophotographic copying apparatus for exposing a photosensitive copy sheet to an image of an original, comprising:
    means defining an exposing station for a photosensitive copy sheet;
    means for projecting a light image of an original onto a photosensitive copy sheet positioned at said exposing station; and
    means for preventing the formation of undesirable images on marginal portions of a photosensitive copy sheet positioned at said exposing station simultaneously with the formation of a light image of an original onto a photosensitive copy sheet, said last mentioned means comprising erasing light source means generating light beams along a path for illuminating marginal portions of a photosensitive copy sheet positioned at said exposing station, adjustable intercepting plate means interposed between the erasing light source means and a photosensitive copy sheet positioned at said exposing station for directing the light emanating from said erasing light source means to selected marginal portions of a photosensitive copy sheet at said exposing station and for preventing said light beams from being projected on any other image forming portion of a photosensitive copy sheet positioned at said exposing station other than the marginal portions thereof, and support means for supporting said intercepting plate means in the path of the light beams generated by said erasing light source means.

2. Electrophotographic copying apparatus as in claim 1 including a conveyor belt means made of transparent material, said conveyor belt means conveying a photosensitive copy sheet to said exposing station, and a member positioned adjacent said conveyor belt means at a slide opposite a photosensitive copy sheet positioned at the exposing station, said member having a surface facing the conveyor belt means and provided with a reflecting surface having thereon a plurality of frames corresponding to predetermined sizes of a photosensitive copy sheet.

3. Apparatus as in claim 1 wherein said copying apparatus is contained with an enclosure and including a viewing window in said enclosure allowing viewing from outside said enclosure of the exposing station and an image of the original on a photosensitive copy sheet formed at said exposing station.

4. Apparatus as in claim 3 including a conveyor belt means for positioning a photosensitive copy sheet at said exposing station, said conveyor belt means being made of transparent material, and a member positioned adjacent said conveyor belt means on a side opposite a photosensitive copy sheet positioned at the exposing station, said member having a reflecting surface facing the conveyor belt means, said reflecting surface having thereon a plurality of frames, each frame corresponding in size to a defined size of a photosensitive copy sheet, said reflecting surface and the frames thereon being visible from outside said enclosure through the viewing window.

5. Electrophotographic copying apparatus as in claim 1 including means defining a viewing window allowing viewing of said exposing station from outside the copying apparatus.

* * * * *